Patented Oct. 15, 1946

2,409,336

UNITED STATES PATENT OFFICE 2,409,336

CHEMICAL-RESISTANT COATING MATERIAL

David W. Young, Roselle, N. J., assignor, by mesne assignments, to Jasco, Incorporated, a corporation of Louisiana No Drawing. Application September 20, 1941, Serial No. 411,651

3 Claims. (Cl. 260—32)

The object of this invention is to formulate improved chemical-resistant coating compositions essentially from thermoplastic hydrocarbon polymers of high chemical resistance and adequate physical properties with ingredients which give the composition enhanced film-forming qualities.

The use of chemical-resistant flexible coatings for weatherproofing materials, such as brick, concrete, felts, fabrics, stone, wood, tiles, etc., especially for protecting metals against corrosion, has risen in importance and has encouraged research in determining how synthetic thermoplastic materials can be utilized most advantageously for this purpose.

A synthetic thermoplastic material found to be one of the most satisfactory in chemical properties for resistance to ageing, moisture penetration, and corrosive chemical action is a high molecular weight hydrocarbon polymer of the polybutene type. This type of polymer is constituted principally of a recurring saturated branched hydrocarbon unit in a very long chain, and therefore it is considered to be a substantially saturated hydrocarbon polymer.

The polybutene polymers, which are formed essentially from isobutene, are represented as constituted principally of the saturated recurring branched unit:

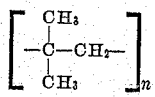

The iso-mono-olefins having 4 to 5 carbon atoms per molecule, particularly isobutylene, are suitable for making this type of polymer, because these monomers have the necessary high polymerization reactivity to form the extremely long chain polymers of branched structure, which have good solubility in hydrocarbon solvents, exceptional inertness, and toughness.

In the polymerization of the iso-mono-olefins, e. g., isobutylene, to obtain polymers having the desired properties, the temperatures of reaction are very low, of the order of about $-40°$ C., $-100°$ C., or lower, and the polymerization is carried out in the presence of a highly active catalyst of a Friedel-Crafts type, such as, preferably, boron fluoride, or aluminum chloride dissolved in a nonreactive solvent of low freezing point, such as methyl chloride. The reaction temperatures are carefully controlled by the use of a refrigerating diluent, and the reactants used are of high purity, i. e., free from inhibiting contaminants, or with suitable promoters.

The physical nature of the hydrocarbon polymer formed from the iso-mono-olefin varies considerably according to the molecular weight. The low molecular weight polymers are sticky and viscous liquids. As their molecular weights increase, the polymers undergo a transition until they finally become tough, elastic, solids having substantial tensile strength.

On the basis of penetration data, a critical change occurs when the molecular weight of the polybutene type polymers is increased to about 27,500 as determined by the Staudinger viscosity method (Der Aufbau der hochmolekulären Org. Verbindungen, C. A. 26,3513). In the vicinity of this molecular weight, the penetration is drastically lowered, indicating a transition from a viscous liquid to plastic solid state. Furthermore, the polymers finally acquire substantial tensile strength and tensile expansion properties when they have a molecular weight of at least about 60,000. Then they become rubberlike, non-tacky, and avoid the cold flow tendencies of the plastic polymers having intermediate molecular weights ranging from about 27,500 to 60,000.

It is the polybutene type thermoplastic polymers of substantial tensile strength, having molecular weights ranging upwardly from 60,000 to as high as about 300,000, more preferably with average molecular weights between about 80,000 and 150,000, which are suitable in their physical properties for the present purposes. These are elastic materials with specific gravities of about 0.93. They retain their elasticity in the temperature range of about $-30$ to over $+100°$ C. They become plastic at temperatures of about 220° C. and above, and withstand thermal decomposition until higher temperatures are reached, such as 300 to 400° C.

These elastic solid polymers with pronounced rubber-like properties of expansibility and elasticity, have other qualities which make for their versatile use in valuable coating fluids, as for instance, high stability against water, oxidation by air, and decomposition by chemicals; remarkable insulation to heat and electricity; good reception and binding power for filling materials of all varieties. These polymers have exceptional chemical resistance against most of the common dilute or concentrated acid and alkalies. Concentrated sulfuric acid, for example, does not materially affect this polymer for a long time at high temperatures.

Advantageously, the elastic solid polybutene type polymers are soluble in volatile hydrocarbon solvents which are among the most economical solvents obtainable. However, even low concentrations of these high molecular weight polymers dissolved in the hydrocarbon solvents form solutions which are extremely viscous, similar in consistency to masticated crude rubber. This high thickening property has retarded the use of these high molecular weight elastic solid polymers in the coating industry.

Another objectionable characteristic that the elastic solid polybutene type polymers have in a pure solvent is a tendency to stretch or string out, so that after the pure solvent solution is applied to any solid surface and the solvent is evaporated, the polymer is left in a stressed condition with a tendency to then become distorted, much the same as in the manner that many gels shrink or contract on drying, and a polymer film coating of this kind on drying becomes non-uniform in its covering and strength.

In accordance with the objects of this invention, I have established that the elastic solid polybutenes, either with or without added pigments or fillers, can be used beneficially in formulating coating compositions having enhanced flow and filming qualities by modifying solutions of these polymers with effective compounds which themselves are normally non-solvents for the polymer, but which in proper proportions, blend homogeneously into a clear solution of the polymer. Not only do these non-solvent modifying agents facilitate the painting or application of the coating or paint composition to form a smooth continuous film on the most varied kinds of materials, such as leather, paper, glass, wood, cloth, stone, concrete, metal, wire, etc., by giving improved fluidity, but they have been ascertained to serve usefully in eliminating the objectionable stringing characteristics which the polymer has in a pure solvent.

With no intention of being bound by any theory as to why or how the improvement is obtained by the use of the modifying agents which are normally non-solvents for the high molecular weight polymers, it may be said that these agents appear capable of preventing the polymer molecules from "lining up" or orienting into a net work of long rod shaped molecules. It has been satisfactorily demonstrated that with these agents in the polybutene coating compositions or paints, the stringing from an air gun is eliminated; also, the film coatings of these compositions avoid the formation of pin holes or unevenness when applied by spraying, brushing, dipping, or spreading.

A characteristic of the polybutene type polymers employed for the present purposes is exhibited in their thickening effect. In this phenomenon, the long chain polymers behave as if they are long rod-shaped molecules which rotate to fill an effective spherical volume much larger than their actual molecular volume. I have found that this effective volume of the polymers in solution is considerably reduced by the non-solvent modifiers, as illustrated by the following data:

| Grams polybutene (104,000 M. wt.) per 100 ml. solvent | Percent non-solvent (ethanol) | Viscosity in centistokes at 100° F. |
|---|---|---|
| 3 | 0 | 70.9 |
| 4 | 0 | 244.0 |
| 5 | 0 | 626.0 |
| 3 | 5 | 49.2 |
| 4 | 5 | 198.0 |
| 5 | 5 | 579.0 |

The kinds of substances which have been found to fulfill the requirements for improving the film-forming qualities of the polybutene coating compositions are volatile substances boiling below the end boiling point of the solvent, and which will not dissolve by themselves the high molecular weight polymer, but rather actually precipitate the polymer out of solution in a pure hydrocarbon solvent when added thereto under normal conditions in certain concentrations (above about 15%). These non-solvents are polar organic compounds having dielectric constants substantially higher than the dielectric constants of the polymers or of solvents for the polymers. The effectiveness of these polar compounds for improving the film-forming qualities of the coating solutions, tends to increase with the dielectric constant which, in general, should be above 4, and preferably above 8, measured at 20° C.

Among the organic compounds which serve for the present purposes as non-solvent modifiers are: chlorinated hydrocarbons, oxygenated hydrocarbons, more specifically the following: methylene dichloride, ethylene dichloride, trichlorethane, tetrachlorethane, 2,2 - dichlorpropane, methanol, ethanol, and higher alkanols having less than about 7 carbon atoms per molecule, esters having less than about 7 carbon atoms per molecule, such as iso-amyl formate and butyl acetate, and low molecular weight ethers. The list of these compounds may be extended a great deal further to include aldehydes, ketones, nitrogen-containing compounds and sulfur-containing compounds, etc., which, in general, have low molecular weights, high dielectric constants (4–8, preferably higher) and boil at a temperature above about 20° C. and below about 200° C., and preferably below 150° C.

Characteristic properties of the non-solvents are shown with respect to the following representative examples:

| Non-solvent | Boiling point at 1 atm., ° C. | Dielectric constant at 20° C. |
|---|---|---|
| Methylene dichloride | 39.8 | 9.2 |
| Ethylene dichloride | 83.7 | 10.4 |
| S-tetrachlorethane | 146.3 | 8.0 |
| 2-2, dichlorpropane | 70.5 | 10.2 |
| Methanol | 64.5 | 30.2 |
| Ethanol | 78.3 | 24.1 |
| n-Pentanol | 137.9 | 13.7 |
| Mesityl oxide | 129.7 | 15.4 |
| Ethyl ether | 34.6 | 4.3 |

From a study of a large number of compounds for their effects as volatile non-solvent modifiers, it was observed that those which could be suitably used have substantially complete immiscibility with the solid polymers at ordinary temperatures in the range of 0° F. to 100° F. and act as precipitants when added in amounts above those desired to a solution of the polymers in this temperature range.

A test procedure found convenient for predetermining whether a polar organic compound has adequate non-solvent action on the polymer consists simply in dissolving a quantity of the polymer in a clear colorless solvent, such as naphtha or kerosene, e. g., 10% by weight of the polymer in 25 cc. of the solvent, then adding, with slight agitation, to the resulting solution the polar organic compound to be tested. If the polar organic compound added in an amount exceeding about 15% causes precipitation of the polymer from the solution observed from the formation of turbidity or separation of the polymer, at about room temperature, then the polar organic compound is indicated to have the desired non-solvent property. However, while the polar compounds having lowest miscibility with the polymer, tend to be the most effective modifiers, it is also important that effective amounts of such polar compounds be restricted, i. e., to about 5 to 15% and be capable of blending homogeneously into the clear polymer solution without causing turbidity, in order to have the solution remain stably homogeneous.

The polymer solvents to be used in the coating compositions may be of any preferred type sufficiently volatile to vaporize readily and be capable of meeting any other technical requirements with regard to non-toxicity, flash point, odor, insolubility in water, stability, etc.

Among the types of solvents found useful may be mentioned: pure low boiling paraffins, olefins, naphthenes, and aromatics; petroleum ether, gasoline, solvent naphtha, kerosene, and other non-polar substances boiling in the range of about 20° C. to about 250° C., e. g., low dielectric constant chlorinated hydrocarbons, e. g., carbon tetrachloride, n-amyl ether, and the like.

Characteristic properties of the solvents are shown in the following representative examples:

| Solvent | Boiling point at 1 atm., ° C. | Dielectric constant at 20° C. |
| --- | --- | --- |
| n-Hexane | 68.75 | 1.87 |
| n-Octane | 125.75 | 1.96 |
| Cyclohexane | 80.8 | 2.05 |
| Benzene | 79.6 | 2.28 |
| Xylene | 137–140 | 2.57 |
| Mesitylene | 164.6 | 2.35 |
| Carbon tetrachloride | 61.2 | 2.2 |
| Trichlorethylene | 86.7 | 3.4 |
| n-Amyl ether | 187–190 | 3.1 |

Various kinds of solid fillers, inert minerals, or pigments which may be suspended or homogeneously dispersed in the coating solution are, for example, finely divided titanium dioxide, silica, zinc oxide, clay, talcum, chalk, barium sulfate, asbestos powder, calcium sulfate, calcium sulfite, leather waste, cork, etc. Compatible solid resins, e. g., oil-soluble phenol formaldehyde resins, asphalts, etc., may be added. Wetting agents such as soaps, sulfonates, phenols and phenolates, particularly calcium or barium salts of di-isobutyl and di-tert-amyl-phenol sulfide may be included in the composition to assist the polymer in wetting and bonding itself to metals or metallic compounds, and to make suspended filling material remain permanently in suspension.

In preparing the coating compositions, it is preferred to use the ingredients in the following proportions by weight, viz., about 2 to 15% by weight of the polymer dissolves in the volatile solvent with about 4 to 15% of the non-solvent homogeneously blended in the polymer solution. The solid fillers or pigments are preferably added in amounts of about 5 to 40% by weight of the composition. The wetting agents are added in minor proportions of about 1 to 2% by weight.

The proportions may be varied depending upon the effectiveness of the particular non-solvent modifier and upon the other ingredients used; also, the proportions may vary somewhat depending on the desired consistency for any given type of application. In addition to types of ingredients mentioned, others employed in small amounts, such as agents for dyeing, plasticizing, drying, stabilizing, or hardening may be added, as desired.

The compositions thus obtained are entirely satisfactory in a practical way for coating a large variety of materials such as those previously mention. They are easily applied so as to form smooth, uniform coating which adhere tenaciously to these various bases when the composition dries. They have a very important characteristic of retaining the polymer stable homogeneously dissolved for a very long time.

For the purpose of further illustrating the invention, the following examples are given of typical coating and paint formulations made in accordance with the present invention:

The following examples relate to the use of the polymers having molecular weights of the order of 80,000 to 150,000 in compositions which form a clear finish:

Example 1

| | Per cent |
| --- | --- |
| Polybutene (104,000 M. W.) | 12 |
| 50% benzene + 50% CCl₄ | 78 |
| Butyl acetate | 10 |

Example 2

| | Per cent |
| --- | --- |
| Polybutene (120,000 M. W.) | 15 |
| Calcium salt of tert-amyl-phenol sulfide | 2 |
| Toluene | 80 |
| Acetyl methylamine | 3 |

Example 3

| | Per cent |
| --- | --- |
| Polybutene (120,000 M. W.) | 15 |
| Polystyrene resin | 4 |
| Benzene | 76 |
| Mesityl oxide | 5 |

Example 4

| | Per cent |
| --- | --- |
| Polybutene (87,500 M. W.) | 10 |
| Cetyl methacrylate resin (about 50,000 M. W.) | 10 |
| Nickel salt of tert-amyl-phenol sulfide | ¹0.5 |
| Petroleum ether | 75 |
| Methyl alcohol | 5 |

¹ Trace.

The following example relates to a coating composition containing white pigment which forms a non-chalking white enamel-like coating:

Example 5

| | Per cent |
| --- | --- |
| Polybutene (104,000 M. W.) | 7 |
| TiO₂ | 18 |
| ZnO | 5 |
| Solvent naphtha | 60 |
| Ethylene dichloride | 10 |

The following examples relate to compositions suitable for use in making black linings for metal tanks and coatings for concrete:

Example 6

| | Per cent |
| --- | --- |
| Polybutene (104,000 M. W.) | 15 |
| Carbon black | 25 |
| Wetting agent | 1 |
| Solvent naphtha | 55 |
| Iso-propyl alcohol | 4 |

Example 7

| | Per cent |
| --- | --- |
| Polybutene (87,500 M. W.) | 12 |
| Soft carbon black | 12 |
| Amyl-phenyl-ethyl-thiophosphite | 1 |
| Kerosene | 70 |
| Ethyl alcohol | 5 |

Example 8

| | Per cent |
|---|---|
| Polybutene (87,500 M. W.) | 15 |
| Soft carbon black | 15 |
| Sodium sulfonate of oxidation wax acids | 1.25 |
| Heavy solvent naphtha | 66.75 |
| Methyl alcohol | 8.0 |

Example 9

| | Per cent |
|---|---|
| Polybutene (100,000 M. W.) | 5 |
| Oxidized asphalt (220–235° F. softening point) | 35 |
| Tert-butyl ether of o-tert butyl-p-cresol | 1 |
| Toluene | 54 |
| Isopropyl alcohol | 5 |

It is to be understood that the examples are themerely illustrative of specific embodiments of the invention and is not intended to be limited thereto.

The present invention is not to be limited to any theory nor to any specific composition given for the purpose of illustration, for there are widely varying modifications which come within the spirit of the invention as defined in the appended claims.

I claim:

1. A chemical-resistant and non-tacky film-forming paint composition comprising in 100 parts by weight of the composition about 12 to 15 parts by weight of polybutenes having molecular weights between 60,000 and 300,000 as determined by the Staudinger viscosity method, about 55 to 70 parts by weight of a volatile hydrocarbon liquid, and 4 to 8 parts by weight of an alkanol having 1 to 3 carbon atoms per molecule dissolved in said volatile hydrocarbon liquid with the polybutenes, remaining parts of the composition being a suspended solid filler with a small amount of a wetting agent.

2. A chemical-resistant and non-tacky film-forming paint composition comprising in 100 parts by weight of the composition 12 to 15 parts by weight of the polybutenes having molecular weights between 60,000 and 300,000 as determined by the Staudinger viscosity method, 55 to 70 parts by weight of a volatile hydrocarbon solvent for said polybutenes, and 4 to 8 parts by weight of an alkanol having 1 to 3 carbon atoms per molecule dissolved in said solvent with the polybutenes, remaining parts of the composition being 12 to 25 parts by weight of suspended carbon black and a small amount of a wetting agent in the resulting solution.

3. A chemical-resistant and non-tacky film-forming black paint composition comprising in 100 parts by weight of the composition 15 parts by weight of polybutenes having molecular weights between 60,000 and 300,000 as determined by the Staudinger viscosity method, 55 parts by weight of solvent naphtha, and 4 parts by weight of isopropyl alcohol dissolved in the solvent naphtha with the polybutenes, remaining parts of the composition being 25 parts by weight of suspended carbon black with about 1 part by weight of a wetting agent.

DAVID W. YOUNG.